(12) United States Patent
Pourtier

(10) Patent No.: US 6,524,045 B2
(45) Date of Patent: Feb. 25, 2003

(54) ANCHOR WITH AN EXPANSIBLE SLEEVE HAVING A COMPRESSIBLE PORTION

(75) Inventor: Fabrice Pourtier, Portes les Valence (FR)

(73) Assignee: Societe de Prospection et d'Inventions Techniques Spit, Bourg-les-Valence (FR)

(*) Notice: Subject to any disclaimer, the term of this patent is extended or adjusted under 35 U.S.C. 154(b) by 0 days.

(21) Appl. No.: 09/990,290

(22) Filed: Nov. 23, 2001

(65) Prior Publication Data

US 2002/0062618 A1 May 30, 2002

(30) Foreign Application Priority Data

Nov. 20, 2000 (FR) .............................. 00 15408

(51) Int. Cl.$^7$ .......................... F16B 13/04; F16B 13/06; E04C 5/00
(52) U.S. Cl. ..................... 411/60.1; 411/42; 411/60.2; 411/61; 411/57.1; 52/698
(58) Field of Search .................... 52/698, 712, 714; 403/2; 411/42, 61, 60.2, 60.1, 57.1

(56) References Cited

U.S. PATENT DOCUMENTS

| 3,515,028 A | * | 6/1970 | Patton |
| 4,692,076 A | * | 9/1987 | Herb |
| 4,900,205 A | * | 2/1990 | Sadri |
| 5,275,519 A | * | 1/1994 | Hainke |
| 5,716,177 A | * | 2/1998 | Schaffer |
| 5,791,845 A | * | 8/1998 | Fulop |

FOREIGN PATENT DOCUMENTS

| DE | 7625795 | 6/1978 |
| DE | 3023411 | 1/1982 |
| WO | WO 92 04547 | 3/1992 |
| WO | WO 96 25601 | 8/1996 |

* cited by examiner

Primary Examiner—Carl D. Friedman
Assistant Examiner—Kevin McDermott
(74) Attorney, Agent, or Firm—Lowe Hauptman Gilman & Berner, LLP

(57) ABSTRACT

An expanding sleeve of an anchor is arranged around a threaded shank engaged in a plug for expanding the sleeve. The sleeve includes an axially compressible portion which includes portions that can be sheared and which are arranged so that after they have been sheared they allow the sleeve to be shortened axially. The sleeve consists of a cut-out sheet-metal blank rolled up on itself.

10 Claims, 2 Drawing Sheets

ANCHOR WITH AN EXPANSIBLE SLEEVE HAVING A COMPRESSIBLE PORTION

BACKGROUND OF THE INVENTION

The current application relates to an anchor having an expanding sleeve arranged around a threaded shank engaged in a plug for expanding the sleeve, the sleeve having an axially compressible, or collapsible, portion.

Such anchors are known, particularly from documents WO 96/25601, WO 92/04547 and DE 3023411.

When there is a desire to attach a part to a support, for example a masonry support, use can be made of such expansion anchors which are fixed in anchoring holes bored in the support. It can happen that the part that is to be fixed sits away from the support at some point. By using a sleeve-type anchor Comprising a compressible portion, it often becomes possible, when anchoring the anchor, to succeed in pressing the part against the support thanks to the compression of the compressible sleeve portion. However, the axial shortening of the compressible sleeve portion is sometimes not enough to press the part against the support before the anchor becomes perfectly anchored in its anchoring hole.

SUMMARY OF THE INVENTION

To this end, the current application relates to an expansion anchor of the type defined hereinabove, characterized in that the compressible sleeve portion comprises means that can be sheared and which are arranged so that after they have been sheared they allow the sleeve to be shortened axially.

Thus, under the action of the force exerted axially by the plug on the sleeve, as it expands, the shearing of the sleeve and its shortening in shear, on the one hand, and its compression and shortening in compression, on the other hand, are beneficially complete so as to ensure an overall axial shortening that is sufficient to press the part that is to be fixed against the support before the anchor becomes anchored.

As a preference, the means that can be sheared are designed to be sheared before the compressible means are compressed.

Advantageously, the means that can be sheared comprise bridges that can be sheared and that connect two sleeve portions that are designed to nest together axially, each bridge preferably being inclined to an axial plane.

As a preference also, the nesting sleeve portions are compressible.

In the preferred embodiment of the anchor of the invention, the sleeve consists of a cutout sheet-metal blank rolled up on itself.

BRIEF DESCRIPTION OF THE DRAWINGS

The invention will be better understood with the aid of the following description of an example embodiment of the anchor of the invention, with reference to the appended drawing, in which.

DETAILED DESCRIPTION

Figure 1:
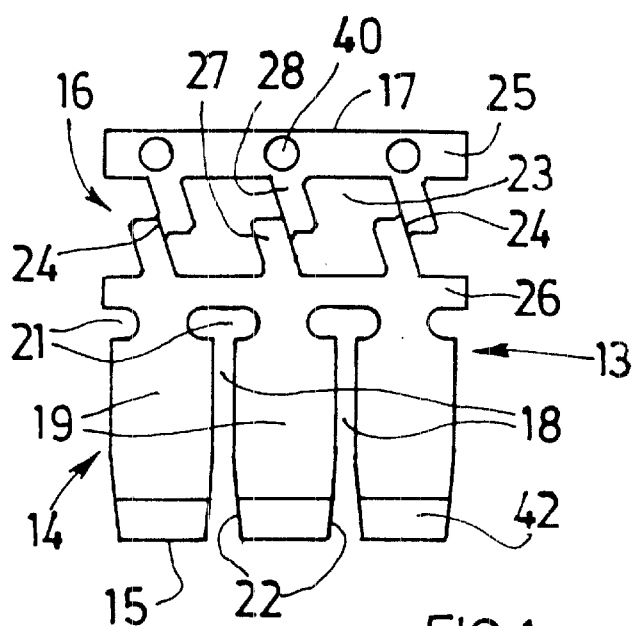
FIG. 1 depicts a view of the sheet-metal blank before it is rolled up on itself to form the expanding sleeve in accordance with an embodiment of the invention.
Figure 2:
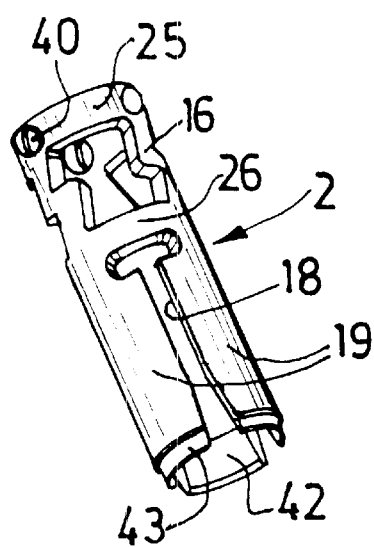
FIG. 2 depicts a perspective view of the expanding sleeve obtained from the blank of FIG. 1.

The anchor depicted in the drawing comprises a threaded assembly 1 of axis 20, an expanding sleeve 2 and a conical expander plug 3. The thread assembly 1 comprises a threaded shank, or screw, 9 proper and a tubular spacing piece 8. The threaded shank 9 has a threaded end 4 and a head end 6, of the nut type. A thrust washer 7 is located between the screw head 6 and the spacing piece 8.

The spacing piece 8 has a diameter roughly equal to that of an anchoring hole in which the anchor will be anchored.

The expanding sleeve 2, with the same outside 5 diameter as the tubular spacing piece 8, is arranged around the portion of shank 9 between the spacing piece 8 and the expander plug 3, against the opposite annular edge 10 of the spacing piece 8 to the screw head 6. The plug 3 is internally tapped and the threaded end 4 of the shank 9 is engaged therein. The large base 11 of the plug 3, facing towards the free end of the shank 1, has a diameter roughly equal to the outside diameter of the spacing piece 8. The small base 12 of the plug 3, facing towards the head 6 of the shank 1, has a 15 diameter slightly smaller than the inside diameter of the expanding sleeve 2, so that it can engage therein and cause the sleeve to expand.

The expanding sleeve here consists of a cut-out sheet—metal blank 13 rolled up on itself about an axis which will naturally be coincident with the axis 20 of the anchor.

The blank 13 has two areas of cut-outs, the first, 14, starting from an edge 15 which will serve as the edge via which the expanding cone 3 is introduced, and the second, 16, near to the other edge 17 which will press against the annular edge 10 of the spacing piece 8.

The cut-outs 18 in the first region 14, which will become the region of expansion of the sleeve, are shaped to form expansion legs 19. The cut-outs 18 are openings with longitudinal edges which will become parallel to the axis 20, separating slightly at 22 near the edge 15 to encourage subsequent penetration of the expander plug 3 and they terminate, at the opposite end to the edge 15, in eyes 21, here slightly oblong, which, at the time of expansion, will prevent any tearing of the sleeve.

The cut-outs 23 of the second region 16 in this instance are shaped as double steps so that this region becomes an axially compressible sleeve portion which, furthermore, has bridges 24 that can be sheared and that connect two portions 25, 26 of this sleeve portion and which can, after they have been sheared, nest together axially.

More specifically, each nesting portion comprises a comb 25, 26 of compressible teeth 27; 28 with parallel edges inclined to a plane perpendicular to the edges 15, 17 and butting together in pairs, top-to-toe, along a very narrow bridge 24 that can be broken in shear, and that is depicted in dotted line in FIG. 1. Once the blank has been rolled up, the teeth 27, 28 are therefore inclined to an axial plane of the anchor. Under the action of a compressive force which, as the sleeve is being expanded by the plug, is applied perpendicularly to the edges 15, 16, the bridges 24 shear before the teeth 27, 28 of the two combs 25, 26 slide one on the other and before the combs 25, 26 nest together to axially shorten the sleeve.

Once the combs have nested together, their teeth 27, 28 can be compressed so as to give rise to further compressive shortening of the sleeve 2 beyond the shortening introduced by the shear.

It will be noted that, by stamping, rotation-proofing bosses 40 have been created along the comb 25 intended to press against the shoulder 10 of the shank 9. Furthermore, the thickness of the blank has been reduced internally and gradually starting from the edge 15 and over a short portion 42 so that once the blank has been rolled up, a conical opening of the sleeve is obtained that matches the conical plug 3. Likewise, to encourage expansion, if the support material is very hard, the thickness of the blank is reduced further, but this time externally, creating an external shoulder near the edge 15 so that the sleeve can be bent over slightly towards the wall of the hole in the support material in this region 43 and so that the plug can pass without the sleeve embedding in the expander plug.

Figure 3:
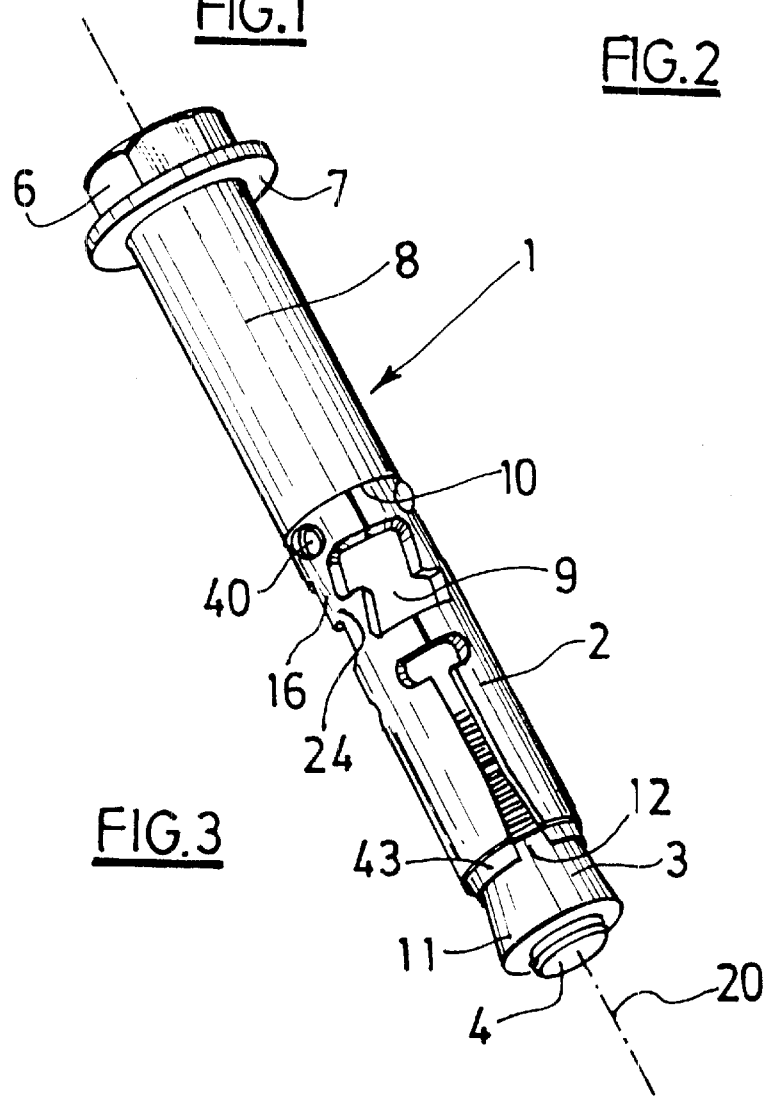
FIG. 3 depicts a perspective view of the anchor in accordance with an embodiment of the invention.
Figure 4:
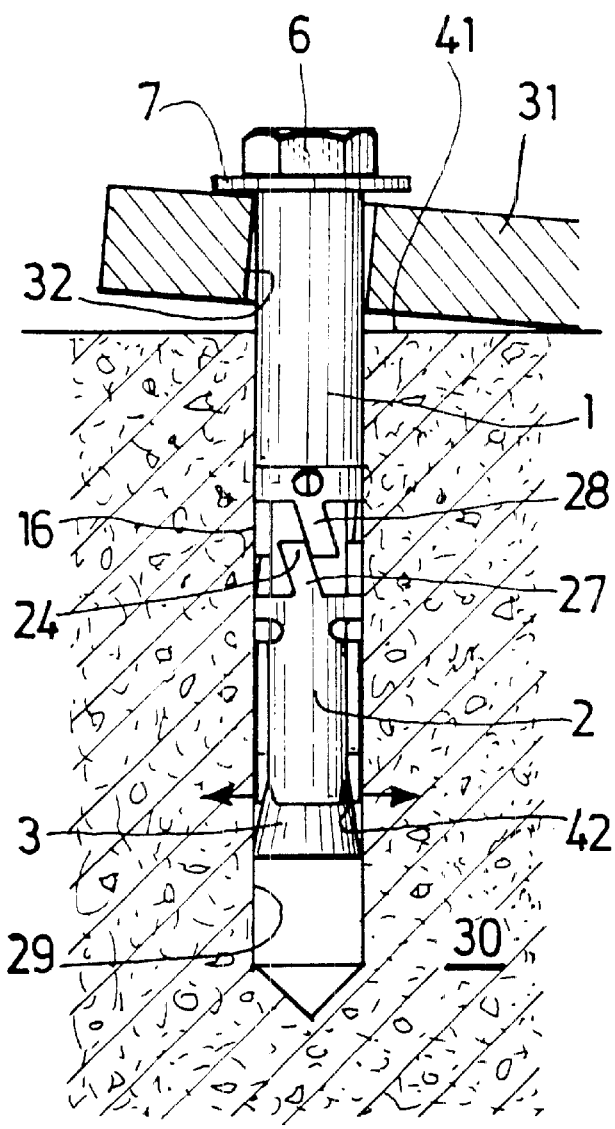
FIG. 4 depicts a view in axial section of the anchor in position in an anchoring hole prior to the fixing of a part.

Having described the three elements of the anchor of the invention, let us now tackle its operation. With these three elements associated, in their relative positions of FIG. 3, and an anchoring hole 29 having already been bored in a support material 30 to which a part 31 is to be fixed, in which part 31 a passage hole 32 for the anchor has also already been drilled, the anchor is passed through the hole 32 in the part and inserted into the anchoring hole 29 until the washer 7 butts against the part. 31, which is not pressed, against the support 30 (FIG. 4). Using the nut 6, the shank 9 which passes through the spacing piece 8 and through the sleeve 2, which is revented from turning in the hole 29 by its rotation-proofing bosses 40 starts to be screwed into the plug 3, which causes the plug 3 to begin to move up inside the sleeve 2 and start to expand the sleeve, anchor it and anchor the plug 3.

Figure 5:
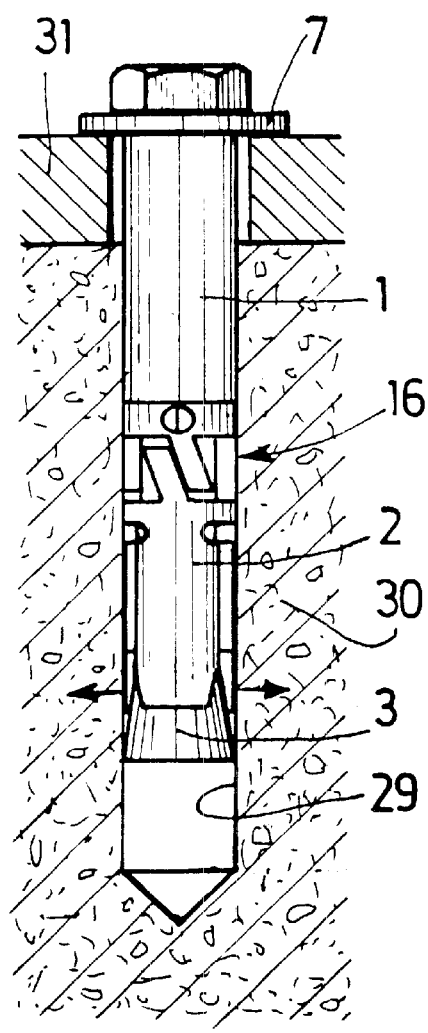
FIG. 5 depicts a view in axial section of the anchor after the part has been fixed.

By continuing to screw the shank 9 into the plug 3 which is anchored in the hole 29, the bridges 24 of the compressible portion 16 of the sleeve 2 are sheared, the sleeve portion 16 is shortened in shear, the shank 9 and therefore the threaded assembly 1 works its way down into the anchoring hole 29 and the part 31 is pressed against the free surface 41 of the support material 30 (FIG. 5). It will be noted that in the example illustrated, the part 31 to be fixed has been pressed against the support material 30 following the shortening of the sleeve in shear. If need be, the compression of the teeth 27, 28 under continuing screwing of the shank would have allowed additional shortening of the sleeve. Once the washer 7 is pressed against the part 31 and the part 31 is pressed against the support material 30, continuing to screw the shank 9 into the expander plug 3 no longer causes the shank 9 to work its way down into the anchoring hole 29 but causes the plug 3 to work its way up inside the hole 29, continuing to expand the sleeve 2 and finally anchoring the anchor and fixing the part 31 to the support 30.

What is claimed is:

1. An anchor comprising:
    a threaded shank having a head and a mating threaded plug;
    a tubular spacer located on said threaded shank between said head and said mating threaded plug; and
    a tubular sleeve located on said threaded shank between said tubular spacer and said mating threaded plug, said mating threaded plug expanding said tubular sleeve upon said mating threaded plug being rotated with respect to said threaded shank so as to move said mating threaded plug axially toward said head of said threaded shank, said tubular sleeve including a rolled up cut-out unitary piece of sheet material comprising:
    a plurality of expansion legs located on an end of said tubular sleeve closest to said mating threaded plug, said plurality of expansion legs expanding radially upon said mating threaded plug being rotated so as to move axially toward said head of said threaded shank; and
    an axially compressible sleeve portion, located on an end of said tubular sleeve furthest away from said mating threaded plug and including a shearable portion which allows said axially compressible sleeve portion to be axially shortened after shearing said axially compressible sleeve portion into two pieces and axially compressing said two pieces toward each other upon said mating threaded plug being rotated so as to move axially toward said head of said threaded shank.

2. The anchor of claim 1, wherein said rolled up cut-out unitary piece of sheet material comprises a rolled up cut-out unitary piece of sheet metal.

3. The anchor of claim 1, wherein said shearable portion is sheared into two pieces prior to axially compressing said two pieces toward each other upon said mating threaded plug being rotated so as to move axially toward said head of said threaded shank.

4. The anchor of claim 1, wherein said shearable portion comprises a plurality of bridges connecting two sleeve portions adapted to nest together axially upon said mating threaded plug being rotated so as to move axially toward said head of said threaded shank.

5. The anchor of claim 4, wherein each of said two sleeve portions adapted to nest together comprises a comb of compressible teeth butting together in pairs, top-to-toe, along one of said plurality of bridges.

6. The anchor of claim 5, wherein said teeth of said combs are inclined with respect to an axis of the anchor.

7. The anchor of claim 2, wherein said shearable portion is sheared into two pieces prior to axially compressing said two pieces toward each other upon said mating threaded plug being rotated so as to move axially toward said head of said threaded shank.

8. The anchor of claim 2, wherein said shearable portion comprises a plurality of bridges connecting two sleeve portions adapted to nest together axially upon said mating threaded plug being rotated so as to move axially toward said head of said threaded shank.

9. The anchor of claim 8, wherein each of said two sleeve portions adapted to nest together comprises a comb of compressible teeth butting together in pairs, top-to-toe, along one of said plurality of bridges.

10. The anchor of claim 9, wherein said teeth of said combs are inclined with respect to an axis of the anchor.

* * * * *